United States Patent [19]

Baggett et al.

[11] Patent Number: 5,575,689

[45] Date of Patent: *Nov. 19, 1996

[54] CONNECTOR MODULES

[75] Inventors: William C. Baggett, Duluth, Ga.; Elliot A. Baines, Jr., Morris Township, Morris County; Wayne S. Filus, Lebanon both of N.J.; Dianne W. Gilland, Lawrenceville, Ga.; Adam S. Kane, Morristown, Morris County, N.J.; Mark G. Spaulding, Florham Park, N.J.; Jeremia P. Starace, Nutley, N.J.

[73] Assignee: Lucent Technologies Inc., Murray Hill, N.J.

[ * ] Notice: The portion of the term of this patent subsequent to May 17, 2015, has been disclaimed.

[21] Appl. No.: 442,866

[22] Filed: May 17, 1995

[51] Int. Cl.⁶ .................................................. H01R 9/22
[52] U.S. Cl. ......................... 439/709; 361/119; 439/188; 439/718
[58] Field of Search .............................. 439/43, 188, 395, 439/404, 135, 709, 718, 719, 922; 361/119, 124; 174/138 F

[56] References Cited

U.S. PATENT DOCUMENTS

| | | |
|---|---|---|
| 3,308,422 | 3/1967 | Boysen ........................................ 439/43 |
| 3,798,587 | 3/1974 | Ellis, Jr. et al. .. |
| 3,966,074 | 6/1976 | Hotchkiss et al. ................... 174/138 F |
| 4,059,331 | 11/1977 | Sedlacek et al. ....................... 439/719 |
| 4,146,755 | 3/1979 | Causse .................................... 361/119 |
| 4,171,857 | 10/1979 | Forberg et al. . |
| 4,283,103 | 8/1981 | Forberg et al. . |
| 4,846,735 | 7/1989 | Teichler et al. ......................... 361/119 |
| 4,851,967 | 7/1989 | Gerke et al. ............................ 439/709 |
| 5,157,580 | 10/1992 | Hegner et al. .......................... 361/124 |
| 5,163,855 | 11/1992 | Gerke et al. ............................ 439/709 |
| 5,285,014 | 2/1994 | Gilchrist ................................. 439/135 |
| 5,364,288 | 11/1994 | Drewanz et al. ....................... 439/709 |

OTHER PUBLICATIONS

Sangamo Bulletin 803A, "Instrument Transformers", May 1982.

U.S. patent application of Baggett et al., Ser. No. 08/442, 901, filed May 17, 1995 (W. C. Baggett 3-3-10).

U.S. patent application of Baggett et al., Ser. No. 08/442, 863, filed May 17, 1995 (W. C. Baggett 2-2-2-2-3-1-2-9).

*Primary Examiner*—Gary E. Elkins
*Attorney, Agent, or Firm*—Lester H. Birnbaum

[57] ABSTRACT

Disclosed is a connector module which permits termination of cross-connect wires on one surface and cable wires on an opposite surface. The module exhibits a generally "Z" shaped configuration which permits test access, jumper insertion, and protector mounting on either surface.

5 Claims, 2 Drawing Sheets

5,575,689

CONNECTOR MODULES

BACKGROUND OF THE INVENTION

This invention relates to modules for electrically connecting sets of wires.

In the telecommunications industry, connecting blocks comprising an array of insulation displacement contacts are typically used in telephone central offices, building entrance terminals, and outside plant cabinets for electrical connection between cables and cross-connect wiring. One example of such a connecting block is the standard 110 connector block. (See, for example, U.S. Pat. No. 3,798,587 issued to Ellis, Jr. et al.) Such connector blocks include rows of insulation displacement contacts mounted within a plastic module. Each contact includes insulation piercing slots on both ends. One set of wires is placed within an alignment strip, and the contact module is placed over the wires in order to make contact therewith. A second set of wires is inserted into the opposite end of the contacts to complete the electrical connection between the sets of wires. In some recent systems, connector modules include slots for mounting protectors which are electrically connected to the contacts. (See, for example, U.S. Pat. Nos. 4,171,857 and 4,283,103 issued to Forberg et al.)

While the prior art connector blocks are adequate, the fact that all wiring is generally done on the same surface has limited the density of wire terminations. Further, when protectors have been included in the block, they usually must be removed in order to insert jumper wires or test probes, creating inconvenience for the user.

SUMMARY OF THE INVENTION

The invention is a connector module which includes two rows of contacts mounted within an insulating housing having a top and bottom surface. Each contact includes an end portion which is capable of providing electrical connection to a corresponding wire. The contacts are mounted so that the end portions of the first row extend through the top surface and the end portions of the second row extend through the bottom surface. The end portions of the two rows are laterally displaced, and the top and bottom surfaces include slots adjacent to the corresponding rows for receiving leads therein which make electrical contact with corresponding contacts.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
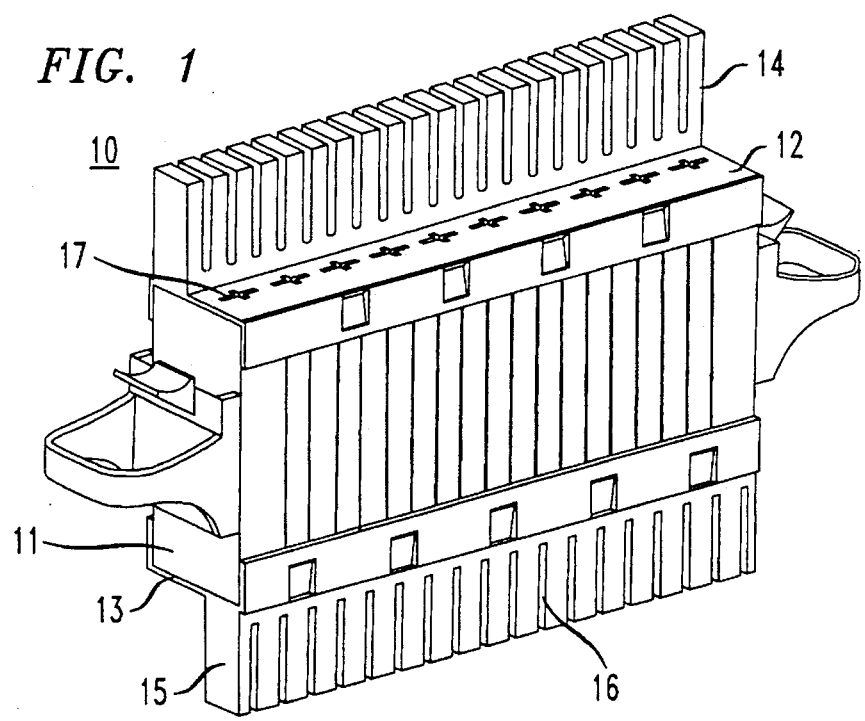
FIG. 1 is a perspective view of a module in accordance with an embodiment of the invention.

Illustrated in FIG. 1 is a module, 10, which can be inserted into a frame (not shown) along with other similar modules to form a connecting block. (For details concerning the mounting frame see U.S. Patent Application of Baggett et al. Case 3-3-10 filed on an even date herewith.) The module includes a housing which is made of insulating material such as plastic. The housing includes an essentially rectangular body portion, 11, which is covered by caps, 14 and 15, respectively. The caps can be made of the same material as the housing and define an upper and lower surface, 12 and 13, respectively, for the housing. Each cap includes a series of slits, e.g., 16, which permit insertion of a wire (e.g., 61 of FIG. 4) therein as discussed below. Each cap also includes a series of slots, e.g., 17 and 18 of FIG. 2, in the top and bottom surfaces, 12 and 13, of the housing, which slots permit insertion of leads, e.g., 19 of FIG. 5, which may be electrically coupled to a cartridge protector, 20 of FIG. 5, a single protector, 21 of FIG. 3, a test probe, 22 of FIG. 4, or possibly other components.

Figure 4:
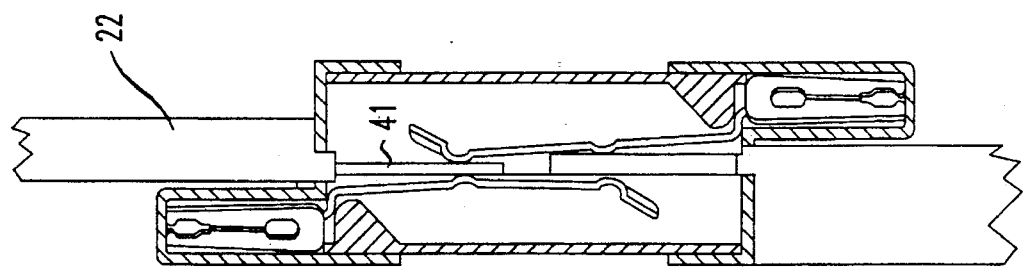
FIGS. 2–4 are cross-sectional views of a module in accordance with the same embodiment.
Figure 3:
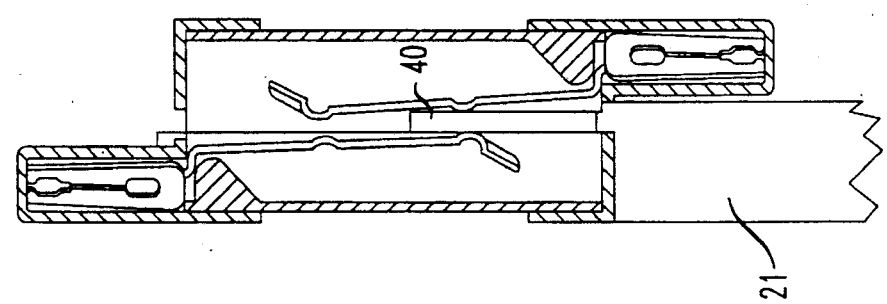
Figure 2:
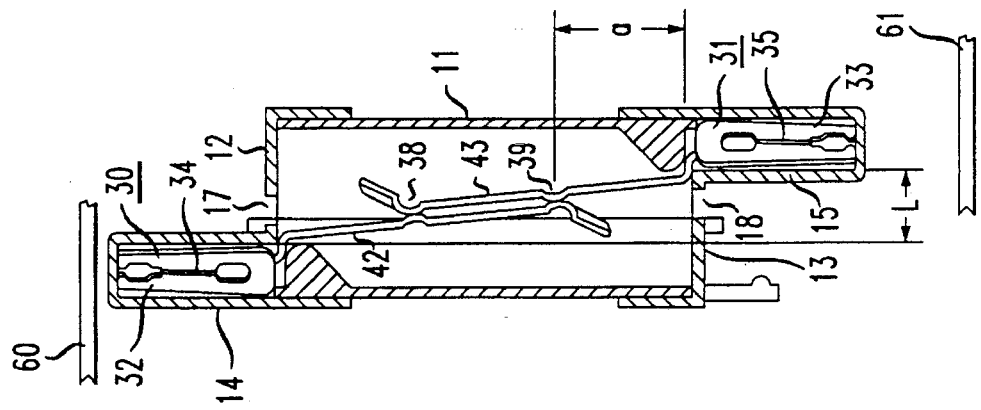

As illustrated in FIGS. 2–4, mounted within the housing is a first row of contacts, e.g., 30, and a second row of contacts, e.g., 31. Each contact, 30 and 31, includes an end portion, 32 and 33, respectively, which is capable of providing electrical connection to a wire, 60 and 61, respectively. In this embodiment, the end portions each comprise a slot, 34 and 35, which pierces the insulation surrounding the wire to establish electrical contact. The contacts are mounted so that the end portions of the first row of contacts, e.g., 30, protrude through the top surface, 12, of the housing, while the end portions of the second row of contacts, e.g., 31, protrude through the bottom surface, 13, of the housing. The end portions, e.g., 33, are also aligned with corresponding slits, e.g., 16 of FIG. 1, in the caps, e.g., 15 of FIG. 1, so that wires may be inserted through the caps for electrical connection by the contacts.

The remainder of the contacts, 30 and 31, also known as the stem portions, extend in the body portion, 11, so that one contact, 30, from the first row makes mechanical and electrical contact with another contact, 31, from the second row. In this embodiment, the two contacts make mechanical and electrical contact at two points, 38 and 39, as more fully discussed in U.S. patent application of Baggett et al. Case 2-2-2-2-3-1-2-9 filed on an even date herewith.

It will be noted that the end portions of the first and second rows of contacts, e.g., 30 and 31, are laterally separated by a distance, L, with the slots, e.g., 17 and 18, disposed in the lateral space. The contact points, 38 and 39, are aligned with their respective slots, 17 and 18, so that, in the example illustrated in FIGS. 3 and 4, a lead, 40, of a protector unit, 21, may be inserted in the slot, 18, to make contact with the stems, and the lead, 41, of a test cord, 22, may be inserted in the slot, 17, to also make contact with the stems.

Figure 5:
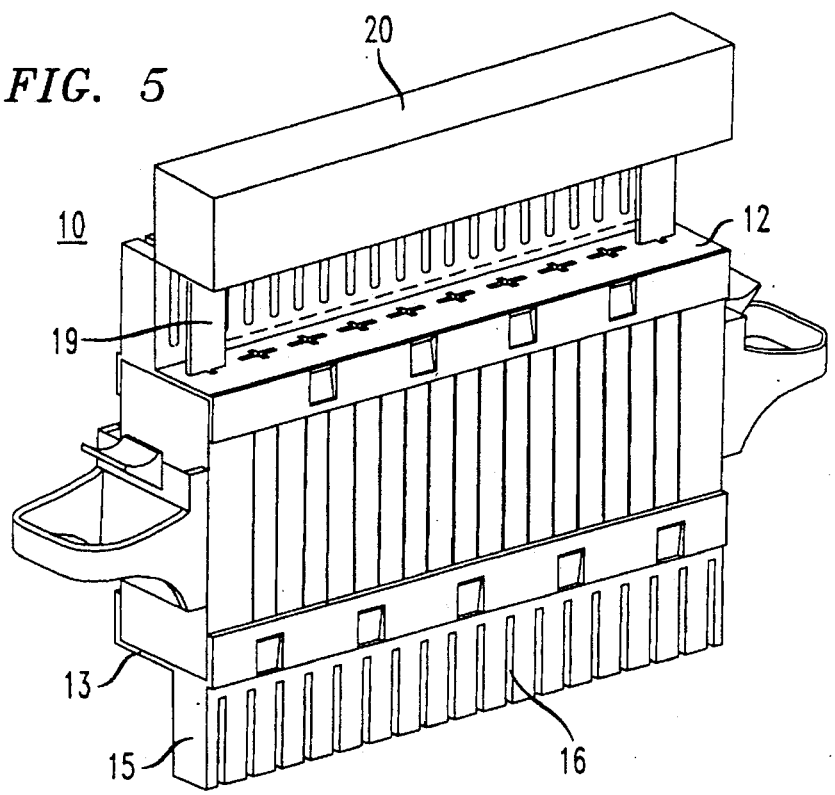
FIG. 5 is a perspective view of the module of FIG. 1 with an additional component illustrated.

It will be appreciated that there are several advantages to the module disclosed herein. For example, wires, 61, from the cable can be connected to the contacts, e.g., 31, of the second row at the bottom of the module, and cross-connect wires, 60, can be connected to the contacts, e.g., 30, of the first row at the top of the module. By utilizing two surfaces of the module, the density of terminations is increased. Further, the user has the option of inserting protector units at the bottom surface as illustrated in FIGS. 3 and 4, or at the top surface as illustrated in FIG. 5, where a protector cartridge, 20, including a plurality of gas tube protectors is illustrated. In either case, the protectors can remain in place when it is desired to insert a test probe, 22, or a jumper cable (not shown) in the opposite surface of the module. Also, with the protectors on the bottom surface, there is plenty of room to connect the cross-connect wires at the top surface without the necessity of removing the protectors.

Various modifications of the embodiment described herein will become apparent to the skilled artisan. For example, the body portion, 11, need not be open at the top and bottom and covered by the caps as shown, but can have its own top and bottom surface with either no cap or with a cap which covers only the end portions of the contacts.

The invention claimed is:

1. A connector module comprising:

an insulating housing having a top and bottom surface;

first and second rows of contacts mounted within the housing, each contact including an end portion which is capable of providing electrical connection to a corresponding wire and a stem portion, the contacts being mounted so that the end portions of the first row extend through the top surface and the end portions of the second row extend through the bottom surface, the end portions of the first and second rows being laterally displaced, and the top and bottom surfaces including slots adjacent to the corresponding rows for receiving therein leads which make electrical contact with corresponding contacts.

2. A connector module according to claim 1 wherein each end portion provides electrical connection by means of an insulation piercing slot.

3. A connector module according to claim 1 wherein the stem portions of the contacts of the first row make electrical connection with the stem portions of corresponding contacts of the second row and are aligned with corresponding slots in the top and bottom surfaces in order to receive leads which are inserted in the slots.

4. A connector module according to claim 1 wherein the housing includes insulating caps placed over the end portions of the first and second rows of contacts, said caps including slits aligned with corresponding end portions to permit wires to be inserted therein for making electrical connection with the end portions and slots aligned with the stem portions to permit insertion of leads therein.

5. A connector module according to claim 1 further comprising a protector component with at least one lead inserted into a slot on one of the top and bottom surfaces.

\* \* \* \* \*